(12) United States Patent
Saito et al.

(10) Patent No.: US 10,907,536 B2
(45) Date of Patent: Feb. 2, 2021

(54) BOOST PRESSURE CONTROL DEVICE FOR INTERNAL COMBUSTION ENGINE

(71) Applicant: TOYOTA JIDOSHA KABUSHIKI KAISHA, Toyota (JP)

(72) Inventors: Yusuke Saito, Gotemba (JP); Masakatsu Nagai, Hiratsuka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 12 days.

(21) Appl. No.: 16/266,399

(22) Filed: Feb. 4, 2019

(65) Prior Publication Data

US 2019/0301354 A1    Oct. 3, 2019

(30) Foreign Application Priority Data

Apr. 2, 2018   (JP) ................................. 2018-071056

(51) Int. Cl.
  *F02B 37/18*   (2006.01)
  *F02B 37/007*  (2006.01)
  *F01D 17/10*   (2006.01)

(52) U.S. Cl.
  CPC .......... *F02B 37/186* (2013.01); *F01D 17/105* (2013.01); *F02B 37/007* (2013.01); *F02B 37/183* (2013.01); *F05D 2220/40* (2013.01)

(58) Field of Classification Search
  CPC .................. F02B 37/18–186; F01D 17/10–18
  See application file for complete search history.

(56) References Cited

U.S. PATENT DOCUMENTS

2015/0082788 A1* 3/2015 Wang .................... F02B 37/186
                                                        60/602

FOREIGN PATENT DOCUMENTS

| JP | 2006-274834 A | 10/2006 |
| JP | 2015-040487 A | 3/2015 |
| JP | 2015-040488 A | 3/2015 |

* cited by examiner

*Primary Examiner* — Laert Dounis
(74) *Attorney, Agent, or Firm* — Oliff PLC

(57) ABSTRACT

The driven rotation axis, the driving rotation axis, the ACT lever, the driving pin, the rod, the driven pin and the WGV lever constitute a linkage. In order to consider the instrumental error caused by the linkage configuration, a link ratio is defined by the equation (Link ratio=(Lwg/Lact)*(sin β/sin α), wherein Lwg is a length of the WGV lever, Lact is length of the ACT lever, β is an angle formed by the WGV lever and the rod, and α is an angle formed by the ACT lever and the rod). The current value input to the DC motor is corrected with a correction coefficient is a value obtained by dividing an actual link ratio by a target link ratio.

5 Claims, 9 Drawing Sheets

BOOST PRESSURE CONTROL DEVICE FOR INTERNAL COMBUSTION ENGINE

CROSS-REFERENCE TO RELATED APPLICATION

The present disclosure claims priority under 35 U.S.C. § 119 to Japanese Patent Application No. 2018-071056, filed on Apr. 2, 2018. The content of this application is incorporated herein by reference.

TECHNICAL FIELD

The present disclosure relates to a device which is configured to control boost pressure of an internal combustion engine.

BACKGROUND

JP 2006-274834 A discloses a WGV (waste gate valve) operated by an electric actuator. The electric WGV actuator includes a rotating shaft on which a lever is provided to rotate in conjunction with the rotation of the rotation shaft. A rod is connected to one end of the lever via a pin. The WGV is connected to an end of this rod. When the lever is rotated by the electric WGV actuator, the rod moves in the axial direction, thereby the WGV is operated to open and close.

Consider a linkage in which another lever is added to the other end of the rod. This linkage has a four jointed type configuration including a lever on the electric WGV actor side (hereinafter also referred to as an "ACT lever") and a lever on the WGV side (hereinafter also referred to as a "WGV lever"). According to such the four-jointed type configuration, structural flexibility is improved. Therefore, for example, it enables the electric WGV actuator to attach to a housing of a compressor to utilize space of an engine room effectively. On the other hand, increase of the clauses due to the linkage configuration may cause instrumental error among linkages and infect controllability of boost pressure.

The present disclosure addresses the above described problem, and an object of the present disclosure is, to minimize influence on the controllability of the boost pressure caused by the instrumental error due to the linkage configuration with which the WGV and the electric WGV actuator are connected.

SUMMARY

A first aspect of the present disclosure is a boost pressure control device for internal combustion engine for solving the problem described above and has the following features.

The boost pressure control device includes a waste gate valve, an electric actuator, a linkage, a rotation angle obtaining device and a control unit.

The waste gate valve is provided on a bypass route to bypass a turbine of a turbocharger.

The actuator is connected to the waste gate valve.

The linkage is provided between the actuator and the waste gate valve. The linkage is configured to transfer an output of the actuator to the waste gate valve. The linkage includes a rod, a first lever and a second lever. The first lever is connected to one end of the rod. The second lever is connected to the other end of the rod.

The rotation angle obtaining device is configured to obtain rotation angle of the first or second lever.

The control unit is configured to control driving force of the actuator.

The control unit is further configured to:
calculate an actual link ratio of the linkage based on the rotation angle;
set a target link ratio of the linkage and a target driving force of the actuator based on operating condition of an internal combustion engine; and
correct the target driving force with a value obtained by dividing the actual link ratio by the target link ratio.

A second aspect of the present disclosure has the following features according to the first aspect.

The actual link ratio is calculated by the following equation:

$$\text{Actual link ratio} = (L2/L1) \times (\sin \beta / \sin \alpha)$$

wherein L1 is a length of the first lever, L2 is a length of the second lever, α is angle formed by the first lever and the rod and β is angle formed by the second lever and the rod.

A third aspect of the present disclosure has the following features according to the first aspect.

The internal combustion engine includes at least two turbines.

Each of the turbines is provided in parallel with at least two exhaust passages.

The actual link ratio is an average of the actual link ratio calculated for each linkage.

A fourth aspect of the present disclosure has the following features according to the first aspect.

The first lever is located at one end of the rod on the actuator side.

The rotation angle obtaining device is configured to obtain the rotation angle of the first lever.

The control unit is further configured to calculate the actual link ratio of the linkage based on the rotation angle of the first lever.

A fifth aspect of the present disclosure has the following features according to the first aspect.

The second lever is located at one end of the rod on the waste gate valve side.

The rotation angle obtaining device is configured to obtain the rotation angle of the second lever.

The control unit is further configured to calculate the actual link ratio of the linkage based on the rotation angle of the second lever.

According to the first and second aspects, the target driving force is corrected by the value obtained by dividing the actual link ratio by the target link ratio. The actual link ratio is calculated based on the rotation angle of the first or second lever. Therefore, according to the actual link ratio, it is possible to detect actual operation state of the linkage. Hence, it is possible to minimize on the influence on the controllability of the boost pressure caused by the instrumental error and enhance the controllability.

According to the second aspect, it is possible to calculate the actual link ratio from the equation describe above.

According to the third aspect, the actual link ratio is calculated for each linkage and the target driving force of each actuator is corrected by the average of the actual link ratio calculated for each linkage. Therefore, even when the internal combustion engine includes multiple turbochargers, it is possible to minimize on the influence on the controllability of the boost pressure caused by the instrumental error due to multiple linkages which are provided corresponding to these turbochargers.

According to the fourth aspect, when the internal combustion engine includes a single turbocharger, it is possible to detect the actual operating state of the linkage based on the rotation angle of the first lever.

According to the fifth aspect, when the internal combustion engine includes a single turbocharger, it is possible to detect the actual operating state of the linkage based on the rotation angle of the second lever.

DESCRIPTION OF EMBODIMENT

Figure 1:
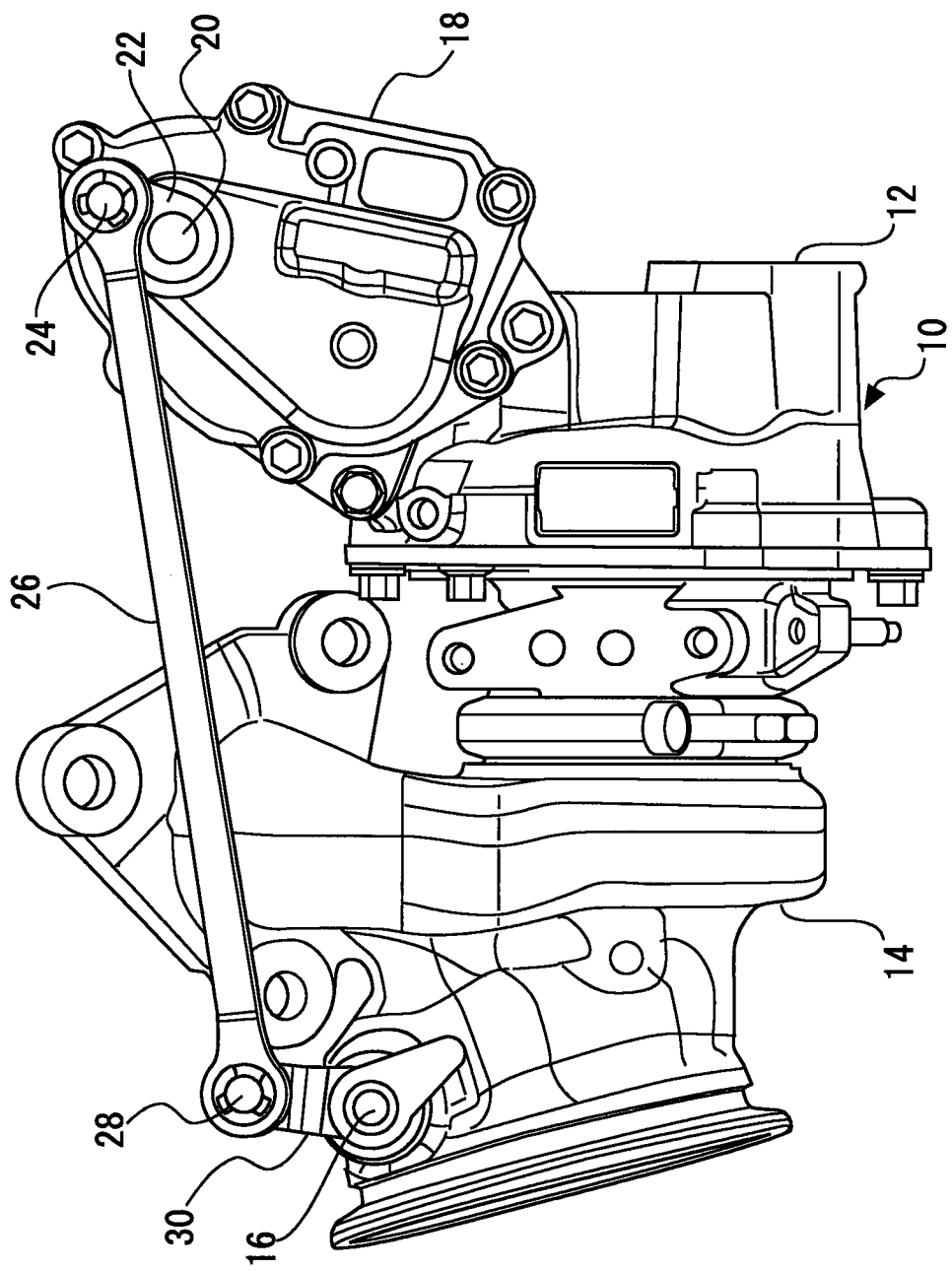
FIG. 1 is a diagram for describing a configuration of a WGV driving device applied to a boost pressure control device according to each embodiment of present disclosure.

Hereinafter, embodiments of the present disclosure will be described based on the accompanying drawings. Note that elements that are common to the respective drawings are denoted by the same reference characters and a duplicate description thereof is omitted. Further, the present disclosure is not limited to the embodiments described hereinafter.

First Embodiment

A first embodiment of present disclosure will be described with reference to FIGS. 1 to 6.
1. Configuration of WGV Driving Device A boost pressure control device for internal combustion engine according to the first embodiment is applied to an internal combustion engine which is configured to adjust boost pressure based on an open and close operation of a WGV. FIG. 1 is a diagram for describing a configuration of a WGV driving device applied to a boost pressure control device according to the first embodiment. The WGV driving device shown in FIG. 1 is attached to a turbocharger 10. The turbocharger 10 includes a compressor 12 and a turbine 14. The compressor 12 is provided in an intake air passage of the internal combustion engine, and the turbine 14 is provided in an exhaust passage of the internal combustion engine. Since the configuration of such the turbocharger 10 is well known, a detailed description thereof will be omitted.

In a housing of the turbine 14, an opening portion (i.e., a waste gate) is formed to communicate an upstream side and a downstream side of the turbine 14. The WGV is provided to open and close the waste gate. The WGV is connected to an electric actuator (hereinafter also referred to as an "electric ACT") 18 via a driven rotation axis 16 which is attached to the housing of the turbine 14.

A driving rotation axis 20 is attached to a cover of the electric ACT 18. The driving rotation axis 20 is provided with an ACT lever 22 which rotates integrally with the driving rotation axis 20. The ACT lever 22 is connected to a rod 26 via a driving pin 24. The rod 26 is connected to a WGV lever 30 via a driven pin 28. The WGV lever 30 rotates integrally with a driven rotation axis 16.

The driven rotation axis 16, the driving rotation axis 20, the ACT lever 22, the driving pin 24, the rod 26, the driven pin 28 and the WGV lever 30 constitute a "linkage". Since the driven rotation axis 16, driving rotation axis 20, driving pin 24 and driven pin 28 are regarded as nodes, this linkage is also referred to as a "four-jointed type linkage".

When the driving rotation axis 20 rotates, the ACT lever 22 also rotates, and the rotation of the ACT lever 22 is transferred to the rod 26 and the WGV lever 30. When the WGV lever 30 rotates, the driven rotation axis 16 rotates, thereby the WGV is operated to open and close.

Figure 2:
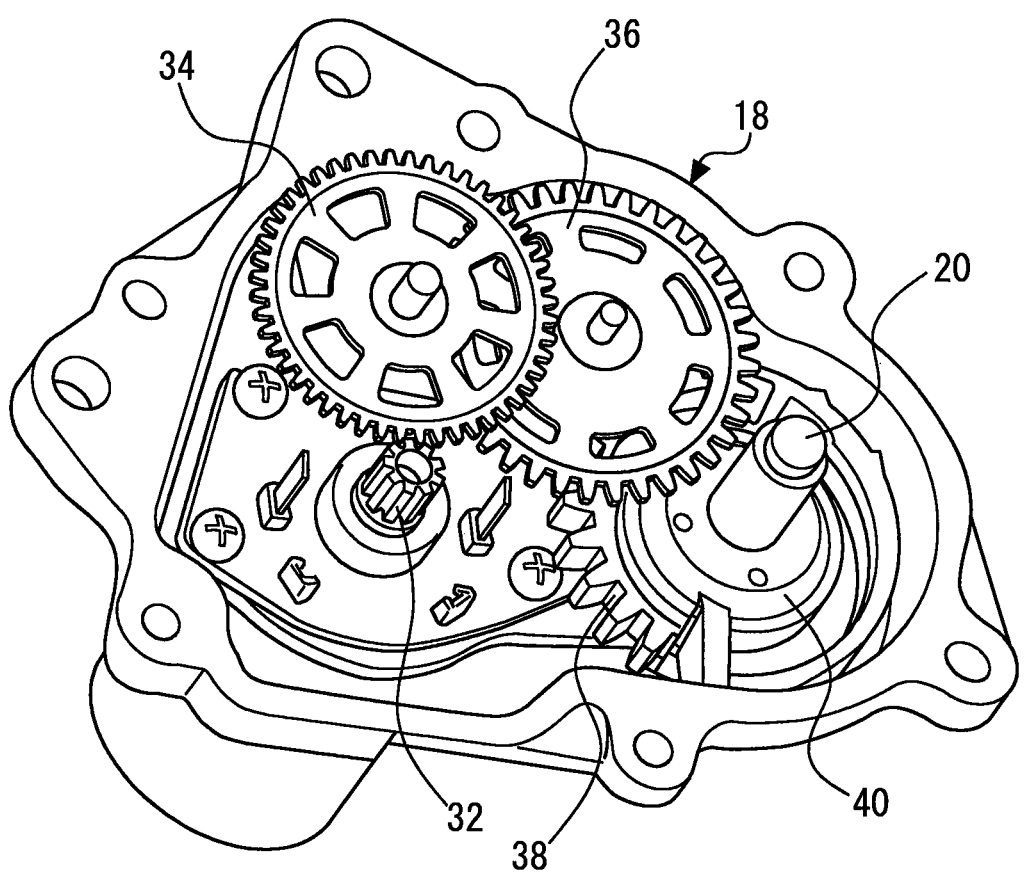
FIG. 2 is a diagram for describing a configuration of an electric ACT.

FIG. 2 is a diagram for describing a configuration of the electric ACT 18. As shown in FIG. 2, the electric ACT 18 includes a DC (Direct Current) motor. In FIG. 2, a pinion 32 connected to an axis of the DC motor is drawn. The pinion 32 is provided so as to mesh with a driving spur tooth gear 34. The driving spur tooth gear 34 is connected to an output gear 38 via a driven spur tooth gear 36. A position sensor 40 for detecting rotation angle of the driving rotation axis 20 is attached to the output gear 38.

Figure 3:
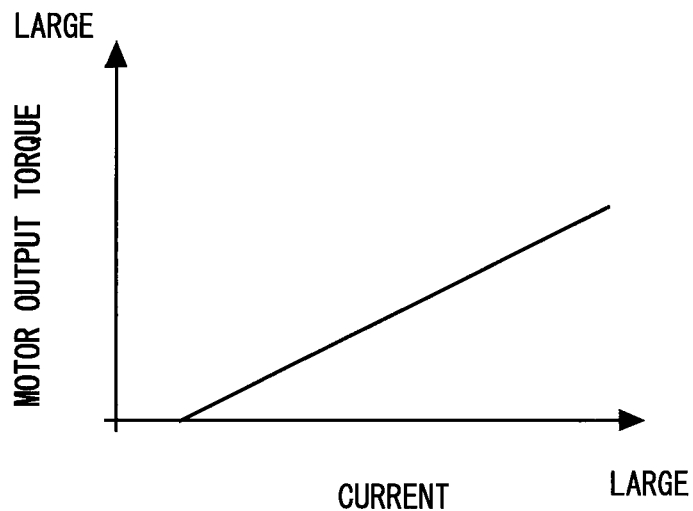
FIG. 3 is a diagram for showing a relationship between a current command value of a DC motor and an output torque of the DC motor.
Figure 4:
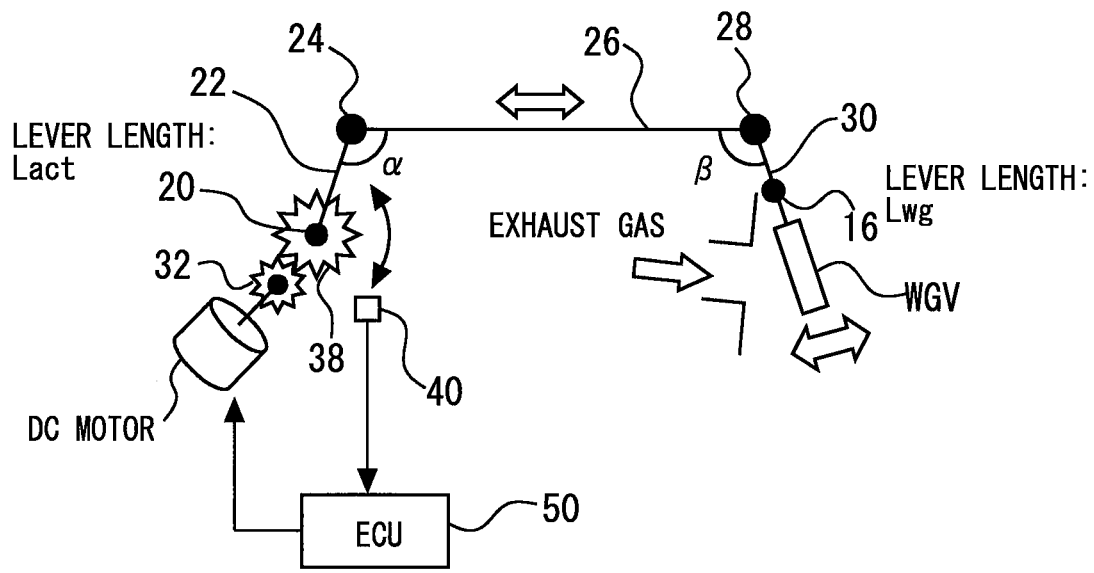
FIG. 4 is a diagram for describing a link ratio and an outline of the boost pressure control device.

When the DC motor is energized, the pinion 32 rotates in one of the forward and reverse directions, and the rotation of the pinion 32 is transferred to the driving spur tooth gear 34, the driven spur tooth gear 36 and the output gear 38. Then, when the output gear 38 rotates, the driving rotation axis 20 rotates.
2. Boost Pressure Control with WGV Driving Device In this first embodiment, in order to adjust the boost pressure of the internal combustion engine to a target boost pressure, a WGV closing force or WGV opening degree (hereinafter collectively referred to as a "driving force for WGV") is controlled. Specifically, the driving force for WGV is controlled based on current value input to the DC motor (hereinafter also referred to as "drive current $I_{DCM}$"). FIG. 3 is a diagram for showing a relationship between a current command value of the DC motor and output torque of the DC motor. As shown in FIG. 3, the relation between the current command value and motor output torque (i.e., the output torque of the DC motor) is represented linearly. Therefore, if the drive current $I_{DCM}$ is set appropriately, it is possible to transfer the output torque of the DC motor to the WGV and control the driving force for WGV.
2.1 Link Ratio However, when the four-jointed type linkage is used, it is necessary to consider instrumental error due to its configuration. Therefore, in this first embodiment, the driving force for WGV is controlled with a link ratio of the linkage. The link ratio will be described with reference to FIG. 4. As shown in FIG. 4, the link ratio is defined by the following equation (1):

$$\text{Link ratio}=(Lwg/Lact)*(\sin \beta/\sin \alpha) \quad (1)$$

wherein Lwg is a length of the WGV lever 30, Lact is a length of the ACT lever 22, β is an angle formed by the WGV lever 30 and the rod 26, and α is an angle formed by the ACT lever 22 and the rod 26.

Figure 5:
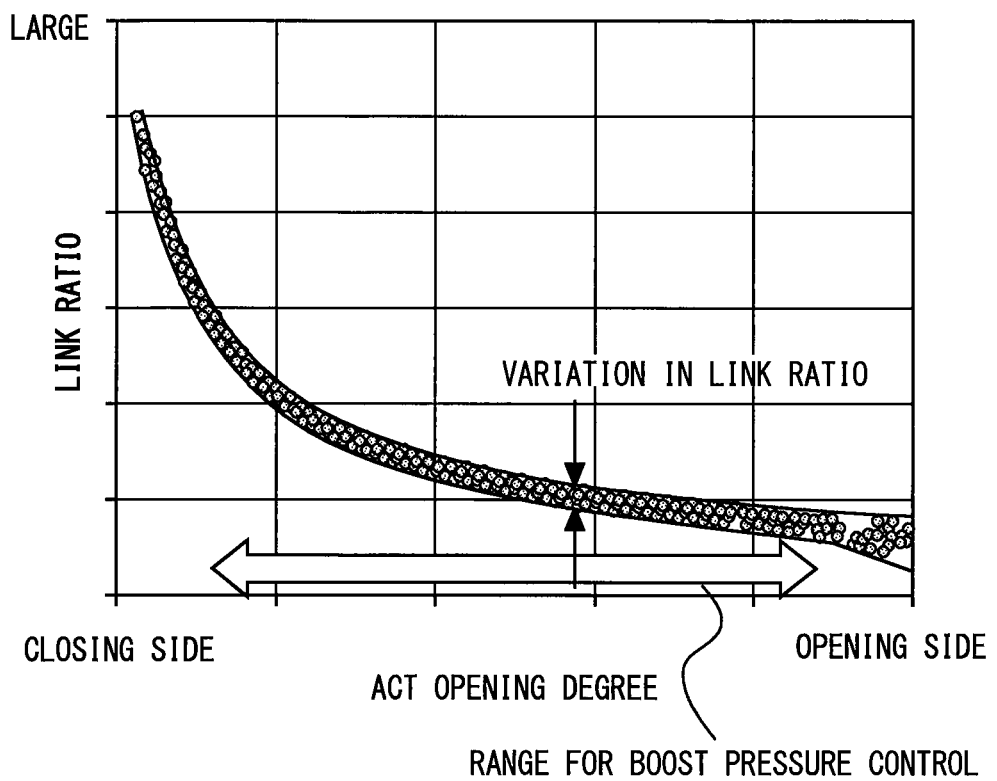
FIG. 5 is a plot diagram of an ACT opening degree and link ratio data.

Here, the rotation angle of the driving rotation axis 20 is defined as "ACT opening degree". And there is a correlative relationship between the ACT opening degree and the link ratio. FIG. 5 is a plot diagram of the ACT opening degree and link ratio data. As can be seen from the figure, in a range where the rotation angle used for the boost pressure control, variation of the link ratio with respect to the ACT opening degree falls within a range sufficient for executing a desired control of the driving force for WGV. Therefore, it can be said that there is the correlative relationship between ACT opening degree and the link ratio. This relationship is stored, as a control map for calculating the link ratio from the ACT opening degree, in a memory of an ECU 50 (i.e., an electronic control unit including an input and output interface, a CPU and the memory, see FIG. 4).

2.2 Setting Method for Drive Current $I_{DCM}$ Using Link Ratio

Figure 6:
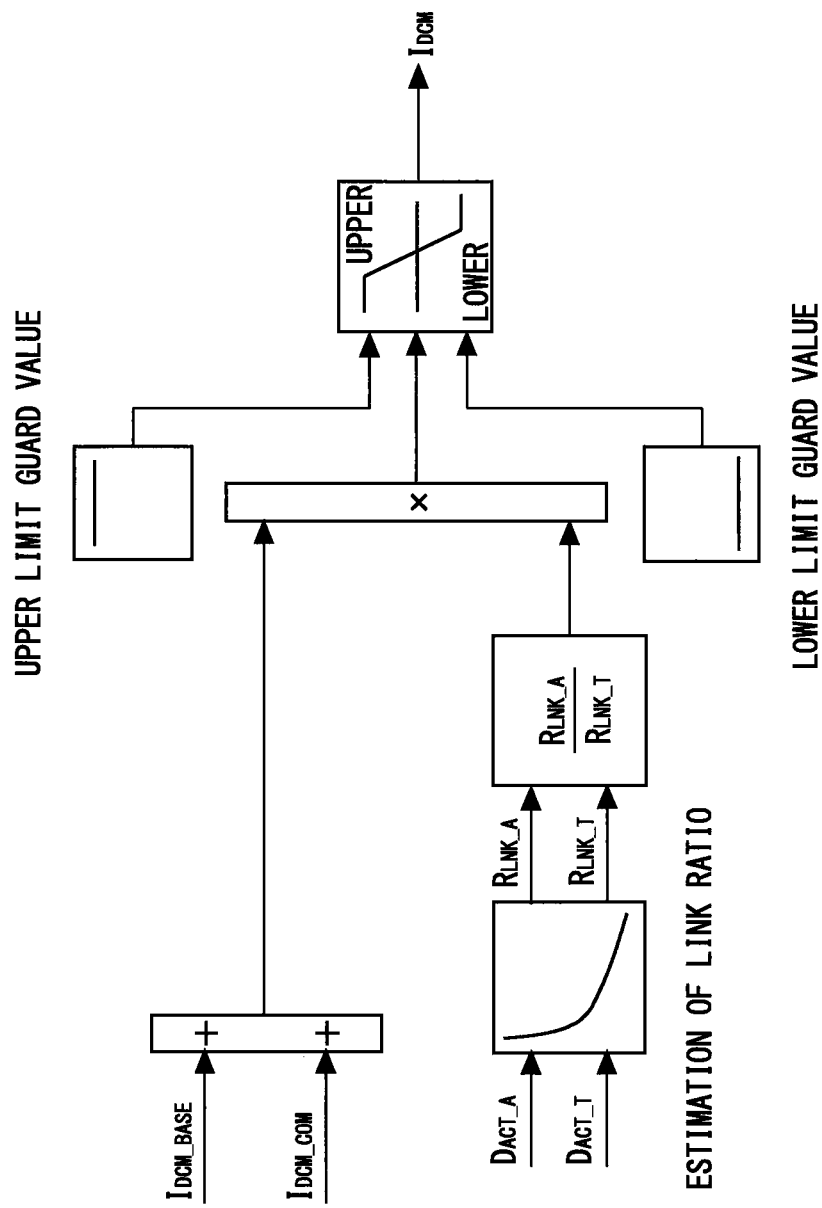
FIG. 6 is a block diagram for describing a control structure when an ECU sets drive current $I_{DCM}$ in the first embodiment of the present disclosure.

FIG. 6 is a block diagram for describing a control structure when the ECU 50 sets the drive current $I_{DCM}$ in the first embodiment. Note that this control structure is realized when the CPU executes a program stored in the memory.

As shown in FIG. 5, ECU 50 adds compensating current for hardware $I_{DCM\_COM}$ to basic drive current $I_{DCM\_BASE}$. The basic drive current $I_{DCM\_BASE}$ is current value of the DC motor set based on target boost pressure. The target boost pressure is a target value of the boost pressure that is set based on the operating condition of the internal combustion engine (e.g., engine rotation speed and engine load). The compensating current for hardware $I_{DCM\_COM}$ is minimum current value of the DC motor which is required to move the WGV being in a fully open state to a closing direction.

The ECU 50 also estimates the link ratio. The link ratio is estimated not only for actual ACT opening degree $D_{ACT\_A}$ but also for target ACT opening degree $D_{ACT\_T}$. The ACT opening degree $D_{ACT\_T}$ is a target value of ACT opening degree set based on the target boost pressure. When these ACT opening degrees to the control map described with reference to FIG. 5, an actual link ratio $R_{LNK\_A}$ and a target link ratio $R_{LNK\_T}$ are calculated.

After calculating the link ratios $R_{LNK\_A}$ and $R_{LNK\_T}$, the ECU 50 calculates a correction coefficient. The correction coefficient is a value obtained by dividing the link ratio $R_{LNK\_A}$ by the link ratio $R_{LNK\_T}$. After calculating this correction coefficient, the ECU 50 multiplies the current value (i.e., $I_{DCM\_BASE}$ $I_{DCM\_COM}$) by the correction coefficient (i.e., $R_{LNK\_A}/R_{LNK\_T}$). Furthermore, the ECU 50 executes guard processing using an upper or a lower limit guard value on the multiplication value to obtain final drive current $I_{DCM}$.

3. Advantageous Effect

According to the first embodiment described above, by using the link ratio which has the correlative relationship with the ACT opening degree, it is possible to reduce the instrumental error due to the four-jointed type linkage configuration. Therefore, even when the four jointed type linkage is used, it is possible to enhance the controllability of boost pressure.

In the first embodiment, the ACT lever corresponds to the "first lever" of the first aspect. The WGV lever corresponds to the "second lever" of the first aspect. The position sensor 40 corresponds to the "rotation angle obtaining device" of the first aspect. The ECU 50 corresponds to the "control unit" of the first aspect. The link ratio $R_{LNK\_A}$ corresponds to the "actual link ratio" of the first aspect. The link ratio $R_{LNK\_T}$ corresponds to the "target link ratio" of the first aspect.

Second Embodiment

Figure 7:
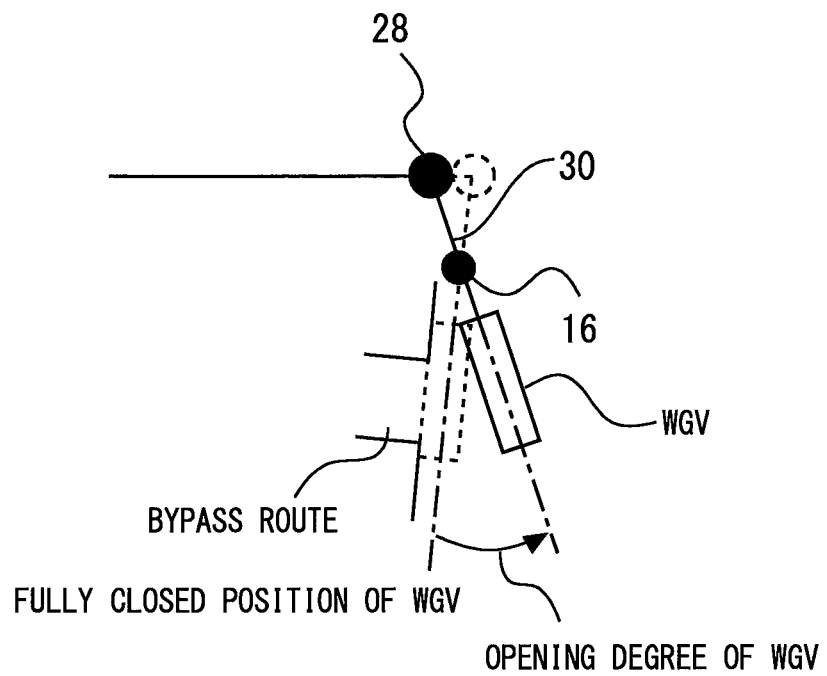
FIG. 7 is a diagram for describing a WGV opening degree.

Next, a second embodiment of present disclosure will be described with reference to FIGS. 7 to 8. The description of the contents overlapping with the first embodiment will be omitted as appropriate.

1. Features of Boost Pressure Control in Second Embodiment

In the first embodiment, the drive current $I_{DCM}$ is set based on the rotation angle (i.e., the ACT opening degree) of the driving rotation axis 20. In the second embodiment, the drive current $I_{DCM}$ is set based on the rotation angle of the driven rotation axis 16. Here, the rotation angle of the driven rotation axis 16 with reference to a fully closed position of the WGV is defined as "WGV opening degree". FIG. 7 is a diagram for describing the WGV opening degree. A position when the WGV closes the bypass route shown in FIG. 7 is defined as the fully closed position of the WGV. The direction going counterclockwise from the fully closed position is defined as the WGV opening degree. The WGV opening degree may be obtained directly by separately providing a position sensor for detecting the rotation angle of the driven rotation axis 16. The driven rotation axis 16 may be estimated by learning processing of the ACT opening degree during the WGV is fully closed. Note that acquiring processing of the WGV opening degree is executed by the ECU 50.

In the first embodiment above, the control map was created based on the finding that there is the correlative relationship between the ACT opening degree and the link ratio. In this second embodiment, a second control map is created based on another correlative relationship between the WGV opening degree and the link ratio. As can be seen from the finding described above, there is a correlative relationship between the WGV opening degree and the link ratio. Therefore, by obtaining the correlative relationship as described with reference to FIG. 5, it is possible to create the second control map for calculating the link ratio from the WGV opening degree. The second control map is stored in the memory of the ECU 50.

2. Setting Method for Drive Current $I_{DCM}$ Using Link Ratio

Figure 8:
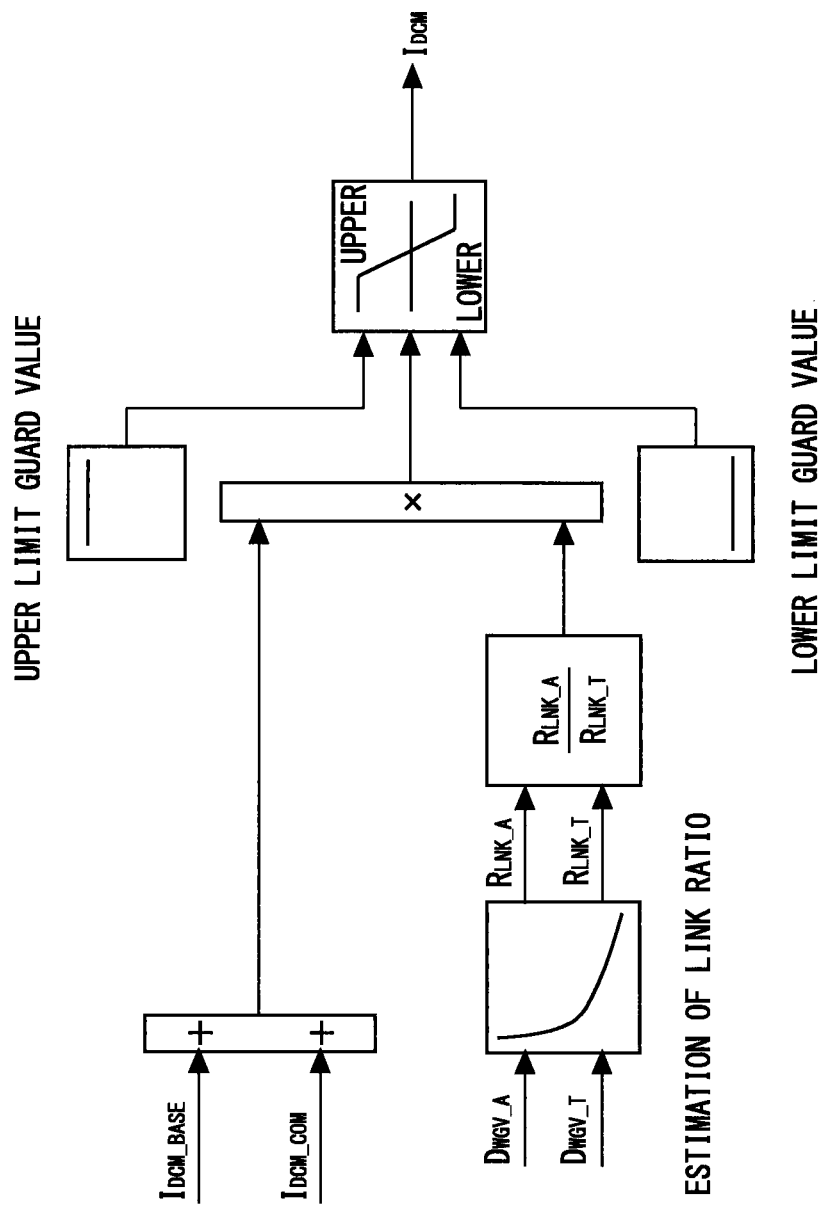
FIG. 8 is a block diagram for describing a control structure when the ECU sets drive current $I_{DCM}$ in a second embodiment of present disclosure.

FIG. 8 is a block diagram for describing a control structure when the ECU 50 sets the drive current $I_{DCM}$ in the second embodiment. Note that this control structure is realized when the CPU executes a program stored in the memory.

The content of FIG. 8 is basically the same as that of FIG. 6. The difference between them is that estimation processing of the link ratio is executed for actual WGV opening degree $D_{WGV\_A}$ and target WGV opening degree $D_{WGV\_T}$. When these WGV opening degrees are applied to the second control map, the actual link ratio $R_{LNK\_A}$ and the target link ratio $R_{LNK\_T}$ are calculated.

3. Advantageous Effect

According to the second embodiment described above, by using the link ratio which has the correlative relationship with the WGV opening degree, it is possible to reduce the instrumental error due to the four-jointed type linkage configuration. Therefore, it is possible to obtain the same effect as the first embodiment.

Third Embodiment

Next, a third embodiment of present disclosure will be described with reference to FIGS. 9 to 10. The description of the contents overlapping with the first embodiment will be omitted as appropriate.

1. System Composition of Third Embodiment

In the first and second embodiments described above, the boost pressure control device is assumed to be applied to a single turbo system. In this third embodiment, the boost pressure control device is applied to a twin turbo system. FIG. 9 is a diagram for describing the configuration of the twin turbo system. The system shown in FIG. 9 comprises two parallel WGV driving devices. The configuration of each WGV driving device is the same as that described in FIGS. 1 and 2. In FIG. 9, for convenience of description, constituent elements of these WGV driving devices are expressed with "R" and "L".

Figure 9:
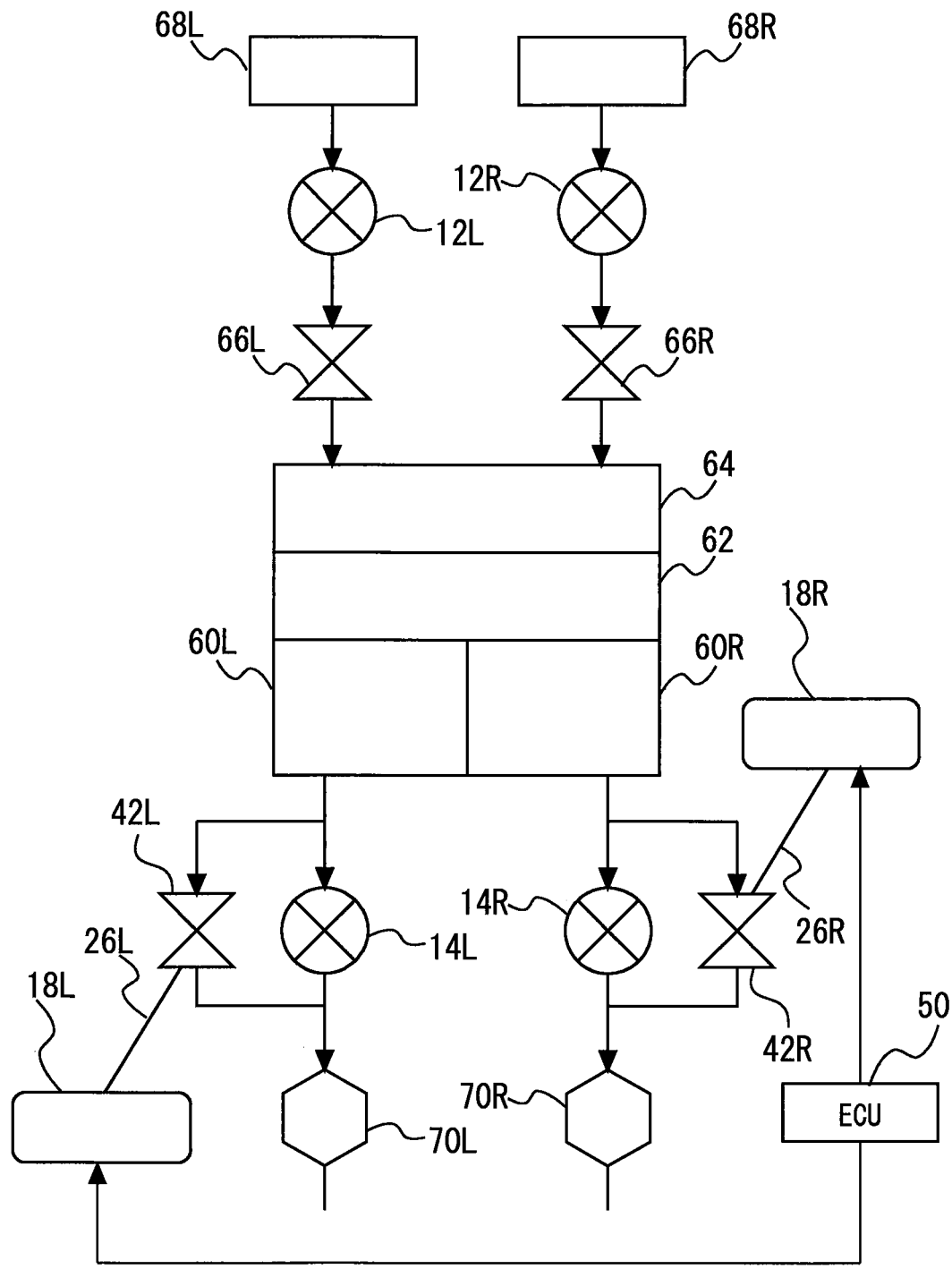
FIG. 9 is a diagram for describing a configuration of a twin turbo system.

The system shown in FIG. 9 includes an engine 60R connected to a turbine 14R and an engine 60L connected to a turbine 14L. The engines 60R and 60L share a surge tank 62 and an intercooler 64. On the upstream side of the intercooler 64, an intake air passage branches off. A throttle 66R and an air cleaner 68R are provided in the intake air passage on the compressor 12R side, and a throttle 66L and an air cleaner 68L are provided in the intake air passage on the compressor 12L side. The exhaust passages on the downstream side of the turbine 14R and 14L are independent. A catalyst silencer 70R is provided in the exhaust passage on the downstream side of the turbine 14R, and a catalyst silencer 70L is provided in the exhaust passage on the downstream side of the turbine 14L.

2. Features of Boost Pressure Control in Third Embodiment

In the first embodiment described above, the correction coefficient was calculated by dividing the link ratio $R_{LNK\_A}$ by the link ratio $R_{LNK\_T}$. In this third embodiment, the link ratios $R_{LNK\_A}$ and $R_{LNK\_T}$ are calculated for each WGV driving device. Also, in the third embodiment, average of each link ratio $R_{LNK\_A}$ is calculated. Then, the correction coefficient is calculated by dividing this average by each link ratio $R_{LNK\_T}$. Hereinafter, for convenience of description, the link ratios $R_{LNK\_A}$ and $R_{LNK\_T}$ on the turbine 14R side are also referred to as "link ratio $R_{LNK\_AR}$" and "link ratio $R_{LNK\_TR}$". Also, the link ratios $R_{LNK\_A}$ and $R_{LNK\_T}$ on the turbine 14L side are also referred to as "link ratio $R_{LNK\_AL}$" and "link ratio $R_{LNK\_TL}$". Also, the average is also referred to as "average link ratio $R_{LNK\_AVE}$".

Figure 10:
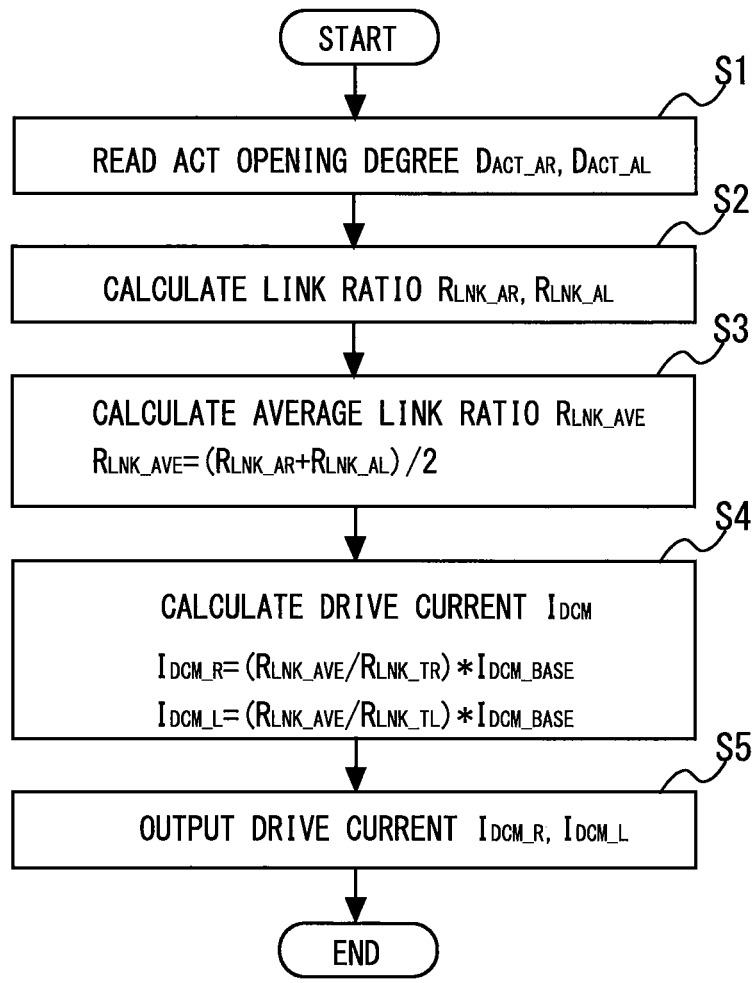
FIG. 10 is a flowchart for describing processing flow when the ECU drives electric ACTs in a third embodiment of present disclosure.

FIG. 10 is a flowchart for describing processing flow when the ECU 50 drives the electric ACTs 18R and 18L in the third embodiment. The routine shown in this figure is realized when the CPU executes program stored in the memory.

In the routine shown in FIG. 10, the ECU 50 first reads the ACT opening degrees $D_{ACT\_AR}$ and $D_{ACT\_AL}$ (step S1). These ACT opening degrees are the rotation angle of the driving rotation axis 20 obtained from the position sensor 40 of each WGV driving device.

Subsequent to the step S1, the ECU 50 calculates the link ratios $R_{LNK\_AR}$ and $R_{LNK\_AL}$ (step S2). These link ratios are calculated by applying the ACT opening degrees read in step S1 to the control map (see FIG. 5), respectively. Incidentally, the link ratios $R_{LNK\_TR}$ and $R_{LNK\_TL}$ may be calculated concurrently with the execution of the calculation processing of the step S2.

Subsequent to the step S2, the ECU 50 calculates the average link ratio $R_{LNK\_AVE}$ (step S3). The ECU 50 calculates the average link ratio $R_{LNK\_AVE}$ using the following equation (2):

$$\text{Average link ratio } R_{LNK\_AVE}=(R_{LNK\_AR}+R_{LNK\_AL})/2 \quad (2)$$

Subsequent to the step S3, the ECU 50 calculates the drive current $I_{DCM}$ (step S4). The ECU 50 first calculates the link ratios $R_{LNK\_TR}$ and $R_{LNK\_TL}$. Then, the ECU 50 calculates the drive current $I_{DCM\_R}$ and $I_{DCM\_L}$ using the following equations (3) and (4). The drive current $I_{DCM\_R}$ is a current value input to the DC motor on the turbine 14R side and the drive current $I_{DCM\_L}$ is a current value input to the DC motor on the turbine 14 L side.

$$\text{Drive current } I_{DCM\_R}=(R_{LNK\_AVE}/R_{LNK\_TR}) \times I_{DCM\_BASE} \quad (3)$$

$$\text{Drive current } I_{DCM\_L}=(R_{LNK\_AVE}/R_{LNK\_TL}) \times I_{DCM\_BASE} \quad (4)$$

Subsequent to the step S4, ECU 50 outputs the drive current $I_{DCM\_R}$ and $I_{DCM\_L}$ (step S5). As a result, the left and right electric ACTs 18R and 18L are driven.

3. Advantageous Effect

According to the third embodiment described above, instead of the link ratios $R_{LNK\_AR}$ and $R_{LNK\_AL}$, the drive current $I_{DCM\_R}$ and $I_{DCM\_L}$ are set using the average link ratio $R_{LNK\_AVE}$ which is the average of each link ratio $R_{LNK\_A}$. When the link ratio $R_{LNK\_AR}$ and $R_{LNK\_AL}$ are separately used in the same way as in the first embodiment, there is a difference between the left and right link ratios. Then, there may be a difference between back-pressure in an upstream of the turbine 14R and that of the turbine 14L, or there may be a difference in expansion ratio between the turbines 14R and 14L.

In this regard, according to the average link ratio $R_{LNK\_AVE}$, even when there is the difference between the left and right link ratios, it is possible to align the difference in the back-pressure or expansion ratio. Therefore, it is possible to increase internal EGR gas (Exhaust Gas Recirculation gas) and improve fuel consumption as compared with the case where there is the difference in the link ratio. Furthermore, it is possible to increase scavenging amount and improve response to boost instruction as compared with the case where there is the difference in the link ratio. Furthermore, it is possible to raise rotation speed of each turbocharger to an upper limit and improve output performance.

Other Embodiments

The boost pressure control device according to the third embodiment may be modified as follows.

In the third embodiment, two turbochargers were arranged in parallel. However, the number of turbochargers arranged in parallel may be three or more. Even in the case where the number of turbochargers is three or more, by calculating the average link ratio $R_{LNK\_AVE}$, it is possible to suppress the occurrence of troubles caused by the difference in the link ratios among the three or more linkages.

In the third embodiment, the link ratios $R_{LNK\_AR}$ and $R_{LNK\_AL}$ were calculated based on the correlative relationship between ACT opening degree and the link ratio on the premise of first embodiment. However, as with the second embodiment, the link ratios $R_{LNK\_AR}$ and $R_{LNK\_AL}$ may be calculated based on the correlative relationship between the WGV opening degree and the link ratio.

What is claimed is:

1. A boost pressure control device for internal combustion engine, comprising:
    a waste gate valve which is provided on a bypass route to bypass a turbine of a turbocharger;
    an electric actuator which is connected to the waste gate valve;
    a linkage which is provided between the actuator and the waste gate valve, is configured to transfer an output of the actuator to the waste gate valve, and includes a rod, a first lever which is connected to one end of the rod and a second lever which is connected to the other end of the rod;

a rotation angle obtaining device which is configured to obtain a rotation angle of the first or second lever; and a control unit which is configured to control a driving force of the actuator;

wherein the control unit is further configured to:

calculate an actual link ratio of the linkage based on the rotation angle;

set a target link ratio of the linkage and a target driving force of the actuator based on operating condition of an internal combustion engine; and correct the target driving force with a value obtained by dividing the actual link ratio by the target link ratio.

2. The boost pressure control device according to claim 1, wherein the actual link ratio is calculated by the following equation:

$$\text{Actual link ratio} = (L2/L1) \times (\sin \beta / \sin \alpha)$$

wherein L1 is a length of the first lever, L2 is a length of the second lever, α is angle formed by the first lever and the rod and β is angle formed by the second lever and the rod.

3. The boost pressure control device according to claim 1, wherein:

the internal combustion engine includes at least two turbines;

each of the turbines is provided in parallel with at least two exhaust passages; and the actual link ratio is an average of the actual link ratio calculated for each linkage.

4. The boost pressure control device according to claim 1, wherein:

the first lever is located at the one end of the rod on an actuator side;

the rotation angle obtaining device is configured to obtain the rotation angle of the first lever; and the control unit is further configured to calculate the actual link ratio of the linkage based on the rotation angle of the first lever.

5. The boost pressure control device according to claim 1, wherein:

the second lever is located at the other end of the rod on a waste gate valve side;

the rotation angle obtaining device is configured to obtain the rotation angle of the second lever; and the control unit is further configured to calculate the actual link ratio of the linkage based on the rotation angle of the second lever.

* * * * *